May 15, 1956 H. V. REED 2,745,268
CLUTCH DRIVEN PLATE
Filed July 1, 1952 2 Sheets-Sheet 1

Inventor:
Harold V. Reed

May 15, 1956     H. V. REED     2,745,268
CLUTCH DRIVEN PLATE
Filed July 1, 1952     2 Sheets-Sheet 2
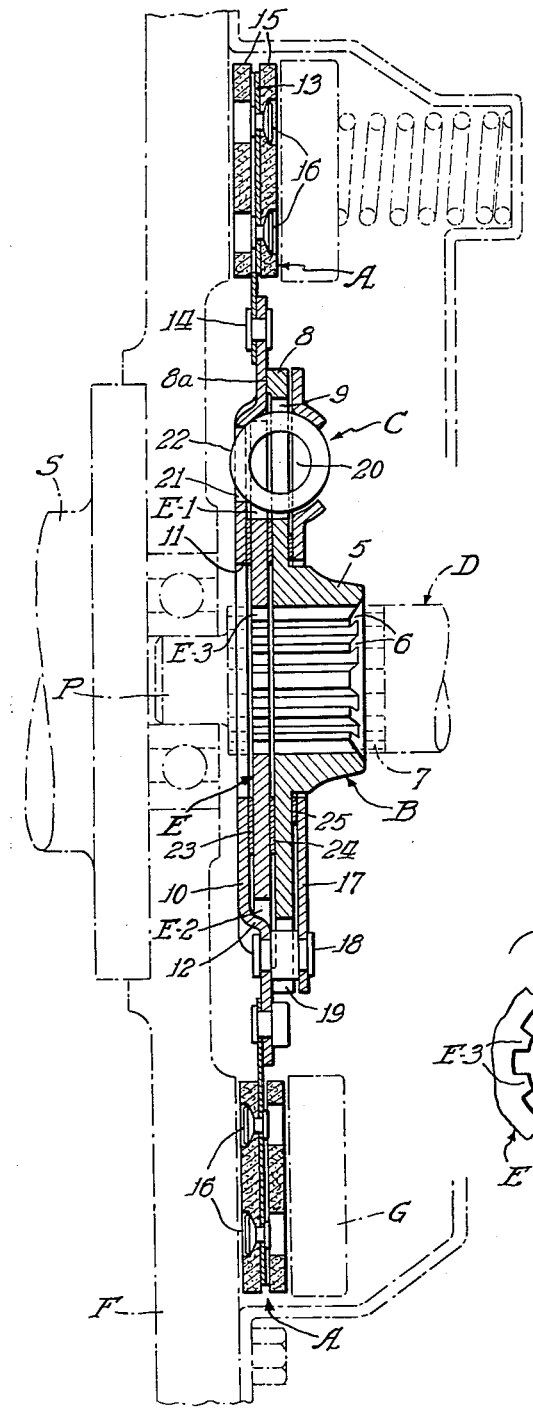
Inventor:
Harold V. Reed
By: E. K. Lundy
Atty.

United States Patent Office 2,745,268
Patented May 15, 1956

2,745,268

CLUTCH DRIVEN PLATE

Harold V. Reed, Chicago, Ill., assignor to Borg-Warner Corporation, Chicago, Ill., a corporation of Illinois Application July 1, 1952, Serial No. 296,569

12 Claims. (Cl. 64—27)

The present invention, in its broadest aspect, relates to a yieldable coupling or torsional vibration dampener assembly for connecting a driving member to a driven member for conjoint rotation of said member and also for limited independent rotative movement of one member with respect to the other member.

A primary object of this invention is to provide a novel and improved coupling or torsional vibration dampener assembly wherein braking means are provided between driving and driven members for creating friction which varies to changes of torque between the driving and driven members, whereby vibrations and rattles are dampened out of the assembly during operation thereof.

The arrangement herein disclosed is capable of a variety of installations for connecting driving and driven members wherein objectable vibration or rattle occurs during rotation of said members, and tests have proven that these objections are definitely eliminated by the present arrangement. By way of example, one type of power transmitting mechanism which is often subject to vibrations and rattle during operation is the coupling or cluch between the engine shaft and the adjacent driven shaft in a motor driven vehicle.

In clutch installations in certain makes of motor vehicles it has been found that objectionable vibration of rattle occurs in these assemblies at different speeds of the vehicle. Road tests have disclosed that rattle is observed when the vehicle is "coasting" at 25 M. P. H. in second speed or intermediate gear, and again at 40 M. P. H. in high speed gear. Also rattle is present in the clutch assembly during acceleration of speed between 25 and 30 M. P. H. in high gear.

Experimentation to ascertain the fundamental cause or causes of the rattles above-mentioned has disclosed that it is necessary to have a dampener type of driven friction plate in which there are two types of friction, one of which is greater than the other. In other words, in order to eliminate the different causes of rattle it is desirable to have a clutch driven plate dampener wherein the range of the coefficient of friction is approximately between .025 and .050. As a result of experiments in which various spring combinations have been utilized it was ascertained that a wide variation in the spring rates had very little, if any, effect in eliminating the objections above described. However, it was found that the question of eliminating the rattles was more directly a matter of friction, and that to maintain the friction within the above-mentioned desirable range involved engineering and production problems which, after careful analysis, was solved by designing the present improved friction coupling or clutch driven plate wherein there is incorporated vibration dampener means for establishing a lower degree of friction for the coasting of the vehicle than the friction required for the actual driving and the acceleration of speed of the vehicle. Also, the arrangement is provided with a supplementary hub plate, structurally independent of the main hub, and cooperatively associated portions of the vibration dampener for assisting in providing supplemental braking means.

A primary object of this invention is to provide a coupling assembly for connecting rotatable driving and driven members and to apply to said members suitable braking means which are adapted to create different values of friction which may vary, within a desirable range, in response to changes of torque during operation of assembly.

Another primarmy object of the invention is to provide a coupling wherein the driving and driven members thereof are subject to braking action of a particular value of friction and there are means which subject the members to a different value of friction when a reversal or change of torque takes place in the coupling.

Another primary object is to provide a supplemental or secondary driven member which is structurally separate from the main driving and driven members, but connected to the main driven member in coactive relation thereto, in combination with means which are effective during normal torque to create a predetermined value of friction between the driving member and supplemental driven member, said value of friction being different from the value of friction to which the main driving and driven members are subjected when change of torque takes place.

Another primary object of the present invention is the provision of a coupling assembly comprising main driving and driven members carried by a rotatable shaft, said members being yieldably connected for conjoint rotation and also for limited rotation independent of each other, the assembly being particularly characterized by the inclusion of a structural independent or supplementary driven member also carried by the shaft between the main driving and driven members, and means are interposed between said members for exerting variable braking action on all of said members or on only certain of said members in response to change of torque of either of said main driving and driven members.

An object of the present improvement is to provide a driven friction plate assembly for clutches wherein a member, structurally separate from the hub, is adapted to rotate said assembly independently of the hub during a change or reversal of torque as when the vehicle is coasting and the driven shaft is rotating the plate assembly.

Another object of the preesnt improvements resides in providing a friction clutch plate assembly which includes, a flanged hub for carrying the facing supporting disc, and a structurally separate hub plate drivingly connected to said hub and disc, the arrangement being characterized by the hub plate and hub being separately splined to the driven shaft and definite clearance is provided between the hub splines and the shaft splines whereby a positive non-vibrative connection is effected between said shaft and the hub plate and disc during reversal or acceleration of torque between the shaft and the friction plate assembly. In other words the separate hub plate has its splines snugly fitted to the shaft splines, and there is definite clearance between the hub splines and said shaft splines, whereby at change of torque the separate hub plate and disc will continue to rotate in unison but there is a lag between the main hub and the shaft.

Another object of the present improvements resides in providing a clutch driven plate assembly with structurally separate dual hub members each separately splined to a shaft and yieldably connected, through yieldable vibration dampener means, for either simultaneous rotation with each other or for independent rotation of one hub member relative to the other hub member. One of these hub members constitutes a support for a friction facing disc which has a yieldable driving connection with both hub members.

With respect to this last described object, the splines of the disc supporting hub member have clearances between them and the shaft splines, while the second hub member, which is a structurally independent element, has its splines snugly intermeshed with said shaft splines. Also a plurality of friction braking members are interposed between the radial members of the structure for cooperation with the yieldable vibration dampener members so that during driving torque more braking members are utilized than when there is a reversal of torque as during coasting of the vehicle. Thus it will be apparent that when change of torque occurs between the clutch plate assembly and the shaft, such change is taken directly by said independent hub member so that any vibration or rattle incident to the torque change is absorbed through the yieldable connection and braking means between the friction disc elements and the independent hub element.

Additional objects, aims and advantages of the invention contemplated herein will be apparent to persons skilled in the art after the construction and operation of the present improvements is understood from the within description. It is preferred to accomplish the objects of this invention and to practice the same in substantially the manner hereinafter fully described and as more particularly pointed out in the appended claims, reference being made to the accompanying drawings which form a part of this specification.

In the drawings:

Fig. 2 is a vertical section taken diametrically through the clutch driven plate approximately along the plane of line 2—2 on Fig. 1 and looking in the direction of the arrows;

Fig. 3 is an enlarged view of central region of the clutch plate;

Fig. 4 shows fragmental face views of the main hub and separate hub plate arranged side by side for comparatively illustrating the arrangement of the splines thereof;

Fig. 5 is a fragmental axial section showing the assembly of the engine crankshaft with the driven shaft and the hub assembly of the driven friction plate.

Figure 1:
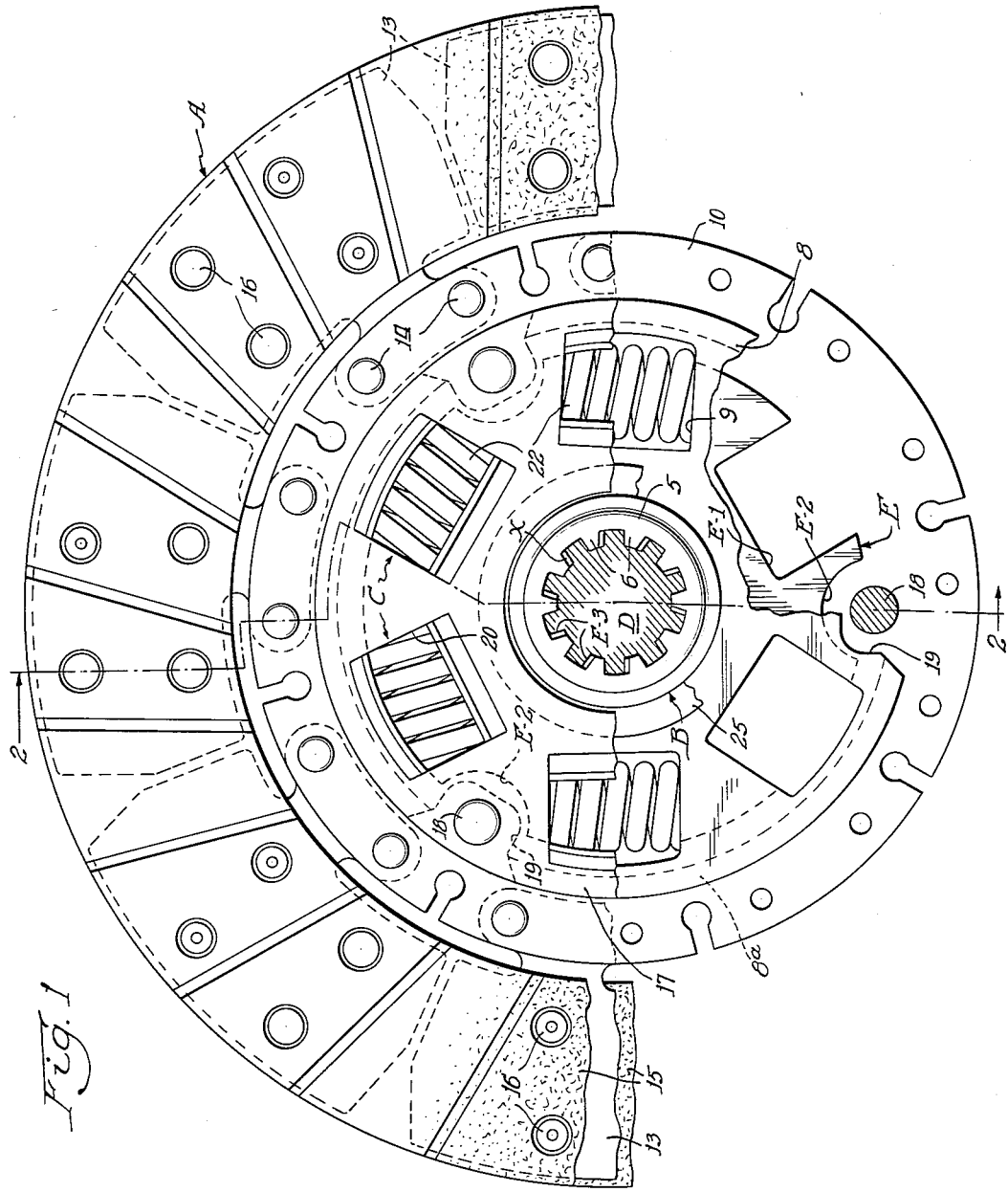
Fig. 1 is a view in elevation showing an upper half of a preferred form of yieldable coupling or torsional vibration dampener contemplated herein, and showing the same as applied to a clutch driven plate.

The drawings are to be understood as being more or less of a diagrammatic character for the purpose of disclosing a typical or preferred form of the improvements in friction clutch driven plates contemplated herein, and in these drawings like reference character identify the same parts in the different views.

The coupling assembly shown in the drawings comprises a plurality of driving and driven members mounted respectively on driving and driven shafts and adapted to be connected together for conjoint rotation and also for limited independent rotative movement with respect to each other.

Briefly described, the novel coupling or torsional vibration dampener contemplated herein and exemplified in the drawings as applied to friction clutches, comprises generally an engine crank or drive shaft S carrying a rotatable driving member or fly wheel F to which a clutch pressure plate G is drivingly connected for axial movement to effect clutch engagement of a friction driven plate assembly, identified as A, which is carried by the rotatable driven member or shaft D. The driven shaft D is piloted as at P in the proximate end of driving crankshaft S. This clutch plate assembly A is mounted on a hub assembly B and is drivingly connected thereto through the yieldable vibration dampener assembly C. The hub assembly B is suitably splined to driven shaft D, and interposed between the assemblies A, B and C there is a structurally independent supplementary hub plate E which has a splined connection with driven shaft D and is cooperatively associated with the assemblies A and B through said dampener assembly C for conjoint rotation with and also for limited independent rotative movement relative to hub assembly B and clutch plate assembly A.

The hub assembly B comprises a main body or hub 5 of hollow cylindrical shape with internal splines 6 which intermesh with splines 7 on the exterior of a driven shaft D and, for the purposes the present improvements, these hub splines 7 are spaced apart greater distances than are the shaft splines 6 thereby to provide clearances $x$ between the respective splines of these members when they are intermeshed as seen in Fig. 4. This main hub 5 is provided with a radially extending flange 8 having therein a plurality of recesses or openings 9 which are preferably located radially inward from the outer periphery of said flange for receiving elements of the vibration dampener assembly C as will hereinafter be more fully explained.

An auxiliary hub or hub plate E of annular form is splined to the shaft D and extends radially outwardly therefrom alongside the forward end face of the main hub B and the adjacent surface of the hub flange 8. This hub plate E has a plurality of angular openings E–1 extending inward from its outer periphery, and there is also a plurality of arcuate notches E–2 intermediate certain of said angular openings E–1 as shown in Fig. 1. The functions performed by these angular openings and arcuate notches is explained later in this specification. The splines E–3 on the inner periphery of this annular hub plate are of proper dimensions to snugly interfit the splines 7 on the shaft D without clearances between them when meshed with each other.

Carried on the hub assembly B there is a friction facing supporting assembly A which preferably comprises a sheet metal disc 10 having therein a central opening 11 of larger diameter than the splined bore of the main hub 5, and said disc extends radially outward alongside of but spaced from the adjacent forward surface of the auxiliary hub or hub plate E as shown in Fig. 2. The annular outer region of the disc 10 is offset, as at 12, to lie close to the adjacent side of the hub flange 8 so that the inner annular region of said disc accommodates and provides a housing for said hub plate E. The outer annular region of said disc has a plurality of yieldable spring cushion members 13 riveted to it as at 14. The axially spaced annular friction facings 15 are anchored to opposite sides of the cushions by rivets 16, whereby said cushions normally space the facings yieldably from each other so that under the pressure which is exerted during clutch engagement said cushions are adapted to collapse against the confronting surfaces of the friction facings.

An annular sheet metal washer plate 17 is positioned next the hub flange 8 at the side thereof which is opposite the hub plate E and disc 10, and outside diameter of said washer plate is approximately the same as the diameter of the hub flange 8 with which it is associated. Spool rivets 18 tie together the outer region of the washer plate 17 and the adjacent region of the disc 10 in a manner so that said disc and washer plate may rotate in unison. The enlarged body portions of these rivets 18 pass through notches 19 in the rim of the hub flange 8 and the arcuate notches E–2 in the hub plate E, as seen in Fig. 2. All of these notches have longer circumferential dimensions than the diameters of the bodies of the spool rivets 18, thereby permitting limited rotative movement of said disc, and washer plate relative to the hub assembly and/or separate hub plate.

A circumferentially extending row of openings 20 is made in the washer plate 17 approximately in registry with the openings or recesses 9 in the hub flange, and a corresponding annular row of openings 21 is provided in the adjacent portion of the disc 10 approximately in registry with the openings in the washer plate, flange and hub plate. A plurality of coil springs 22 are seated in the openings 9, 20 and 21 to drivingly connect the disc 10, the hub flange 8 and the washer plate 17 in a manner so that these parts are adapted to rotate in unison and, in addition, the disc and washer plate may have limited rotative movement independent of the hub assembly B. Similarly, there will be limited rotative movement between the auxiliary hub plate E and the facing supporting assembly A, particularly during change of torque or during acceleration of speed of shaft D.

Frictional braking means are provided for cooperation with the hub flange, hub plate and the facing supporting assembly during the relative rotative movement between these parts of the clutch plate assembly, said braking means preferably taking the form of friction washers or spacers of thin metal. As seen in Figs. 2 and 5, a friction braking washer 23 is interposed between the radially inner regions of the disc 10 and the adjacent confronting surface of the independent hub plate E, and a friction braking washer 24 is positioned between said hub plate and the forward surface of hub assembly B. The washer plate 17 is spaced from the hub flange 8 by a friction washer 25, and the radially outer region of hub flange 8 is made thicker than its main body portion by providing an axially or forwardly extending annular flat rib or shoulder 8a which is continuous and frictionally contacts the adjacent annular region of the disc 11 radially outward of the springs 22. This braking shoulder 8a provides additional braking means acting between the disc and hub flange radially beyond and in addition to the braking washers 23, 24 and 25 at the inner annular region of the assembly adjacent the main hub member 5. The effect of the yieldable vibration dampener assembly, including the braking means described above, is to dampen vibrations and rattle which may occur during reversal of torque or acceleration of driving speed in the operation of a motor vehicle while the friction clutch plate is engaged between the main driving and driven members such as a flywheel and a driven shaft.

It is apparent that the present arrangement provides effective braking means between all of the radially extending elements of the clutch plate assembly thereby to resist independent rotative movement of the facing supporting assembly relative to the hub assembly or the hub plate, and also independent rotative movement of the separate hub plate relative to the main hub members. When this improved yieldable coupling arrangement is incorporated in a friction clutch assembly which is installed in a motor vehicle and a change of torque takes place during movement of the vehicle, the independent hub plate E, being snugly fitted to shaft D will transmit the drive to the shaft D and any vibrations or rattle will be absorbed through the dampener assembly C which connects said hub plate E to the facing supporting assembly A. When the splines 6 of the main member 5 move a distance equal to the clearances x, the confronting surfaces of the spline teeth 6 and 7 of the main hub 5 and shaft will become drivingly engaged. A similar operation will take place when the vehicle is "coasting" in second or intermediate gear at approximately 25 M. P. H.

During ordinary driving conditions with the present vibration dampener in a clutch plate, considerable friction is created by the braking means 23, 24 and 25 acting between the disc 10, the supplementary hub plate E, the hub flange 8 and the washer plate 17, and this friction is increased by the braking relationship between the outer annular rim 8a on the hub flange and the confronting annular region of the discs so that vibrations or rattle are absorbed. When a reversal of torque takes place in the moving vehicle (as during coasting or acceleration of torque) any rattle or vibration is immediately absorbed by the supplementary hub plate and the braking means 23, 24 and 8a. Thus two types of friction are incorporated in this clutch driven plate assembly, the first type a higher coefficient of friction for ordinary driving conditions, and the second type having a lower coefficient of friction for changes of torque when the vehicle is coasting or the speed is accelerated.

While the invention has been described in detail in its present preferred form or embodiment, it will be apparent to persons skilled in the art, after understanding the construction, operation and function of the improvements contemplated herein, that various changes and modifications may be made therein without departing from the spirit or scope thereof. It is aimed in the appended claims to cover all such changes and modifications.

What is claimed is:

1. Torsional vibration dampener means connecting a rotatable driving member to a driven member, comprising, a hub connected to said driven member and having a radial flange; a radial disc alongside said hub flange and adapted to be rotated by said driving member; a supplementary hub defined by a hub plate mounted on and connected to said driven member for rotating therewith, said hub plate also being movable independently of said hub and radial disc; means yieldably connecting said hub flange, radial disc and hub plate for conjoint rotation, and for limited independent rotative movement of said disc and hub plate with respect to said hub and flange; and braking means interposed between said hub flange, radial disc and hub plate, said braking means being effective during rotation of said driving and driven members to create friction which varies in response to changes of torque between said members.

2. Torsional vibration dampener means as defined in claim 1 wherein the hub plate is snugly splined to the driven member and the hub has a loosely splined connection with the driven member.

3. Torsional vibration dampener means connecting a rotatable driving shaft to a driven shaft, comprising, a hub splined to said driven shaft and having a radial flange; a radial disc alongside said hub flange and adapted to be rotated by said driving shaft; a hub plate between said hub and radial disc and splined to said driven shaft; means yieldably connecting said hub flange, radial disc and hub plate for conjoint rotation, and for limited independent rotative movement of said disc and hub plate with respect to said hub and flange; and braking means interposed between said hub flange, radial disc and hub plate, said braking means being effective during rotation of said driving and driven shafts to create friction which varies in response to changes of torque between said shafts.

4. Torsional vibration dampener means as defined in claim 3 wherein the hub plate is snugly splined to the driven shaft and the hub has a loosely splined connection with the driven shaft, and one of the braking means is interposed between the radially outer region of the hub flange and the confronting region of the disc.

5. A clutch comprising a driving member, and a driven member adjacent thereto; a supplementary driven member intermediate said driving member and said first driven member; common means supporting said members; dampener means connecting said three named members for conjoint rotation and also for limited independent rotative movement of each one member with respect to both of the other two members; annular braking means between the radially inner regions of said three members, and annular brake means on said first mentioned driven member radially outward of said connecting means and frictionally contacting said driving member, said first mentioned driven member having a loose fitting connection with said supporting means for effecting limited independent rotative movement of said first-mentioned driven member with respect to said common supporting means during changes of torque.

6. A clutch as defined in claim 5 wherein the driving member has an axially offset region which encompasses the supplementary driven member and positions the outer region of the driving member in frictional contact with the radially outward second-mentioned annular brake means on said first-mentioned driven member.

7. In a power transmitting coupling assembly, a hub member having a flange; a plate member alongside said hub member; a splined driven shaft supporting said members; vibration dampener means yieldably connecting said members for rotation with said shaft and for limited independent rotative movement with respect to each other; internal splines on each of said members coacting with said shaft splines, the splines on said hub member having clearance with respect to the shaft splines, and the splines on said plate member having snug fit with the shaft splines, said spline arrangement being effective during change of torque to provide delayed rotation of said hub member relative to said shaft.

8. An assembly as defined in claim 7 including a disc adapted to receive torque from a prime mover, said disc being positioned alongside and movably connected to one of said members through said yieldable dampener means.

9. A torsional vibration dampener connecting a driving shaft to a driven shaft, comprising a radial driving plate; a radial driven plate carried by said driven shaft; yieldable means connecting said plates for conjoint rotation and also for limited independent rotative movement of one plate with respect to the other plate; a first annular hub plate mounted directly on said driven shaft for limited rotational movement independently of said driven shaft, the outer region of said first annular plate lying between and yieldably connected to said driving and driven plates for rotation therewith; a second annular hub plate between said first annular plate and said driving plate; first braking means defined by a plurality of braking elements interposed between said plates, and second braking means defined by a brake element on said second annular plate and acting in opposition to said first braking means, all of said braking elements cooperating under torque load to create friction against all of said plates and to vary friction therebetween in response to acceleration and deceleration of torque between said shafts.

10. A clutch comprising a driving first member, and a driven second member adjacent thereto; a rotatable shaft supporting said first and second members; a supplementary third member intermediate said first and second members and connected to said shaft; dampener means connecting said three members for conjoint rotation and also for limited independent rotative movement of each member with respect to the two other members; first annular braking means between the radially inner regions of said three members; and second annular braking means on said second member at a location radially outward from said dampener means and frictionally contacting said first member, said second member having a loose connection with said shaft for effecting limited independent rotative movement of said second member during changes of torque.

11. A clutch as defined in claim 10 wherein the driving first member has thereon an axially offset region which encompasses the supplementary third member and positions the outer region of said first member in frictional contact with the radially outward second brake means on the driven second member; and the supplementary third member has a connection with the shaft which prevents independent rotative movement of said supplementary third member with respect to said shaft.

12. In a friction clutch driven plate assembly, a hub member including a flange; a hub plate member separate from and positioned alongside said hub member and flange; a friction facing supporting disc alongside and movably connected to one of said members; a driven shaft supporting said hub plate member, said hub member and said disc for rotation with said shaft and for limited independent rotative movement of said hub plate member, said hub member, and disc one with respect to the other; said assembly comprising braking means interposed between said hub plate member, said hub member and disc and being operative during rotation of the clutch plate assembly to create friction which varies in proportion to changes of torque applied to said facing supporting disc.

References Cited in the file of this patent
UNITED STATES PATENTS

| | | |
|---|---|---|
| 2,124,059 | Geyer | July 19, 1938 |
| 2,221,463 | Wolfram | Nov. 12, 1940 |
| 2,291,405 | Nutt | July 28, 1942 |
| 2,574,573 | Libby | Nov. 13, 1951 |